Sept. 21, 1954   G. A. LYON   2,689,578
SYSTEM FOR CONVEYING STAMPINGS INTO AND OUT OF LIQUID BATHS
Filed Dec. 29, 1950   3 Sheets-Sheet 2
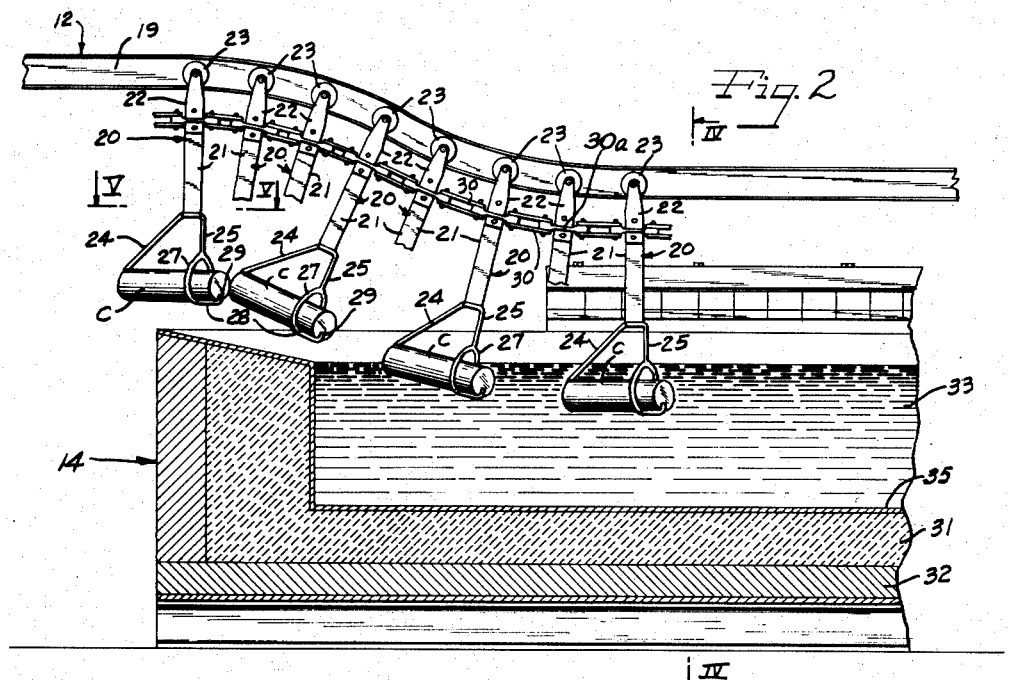
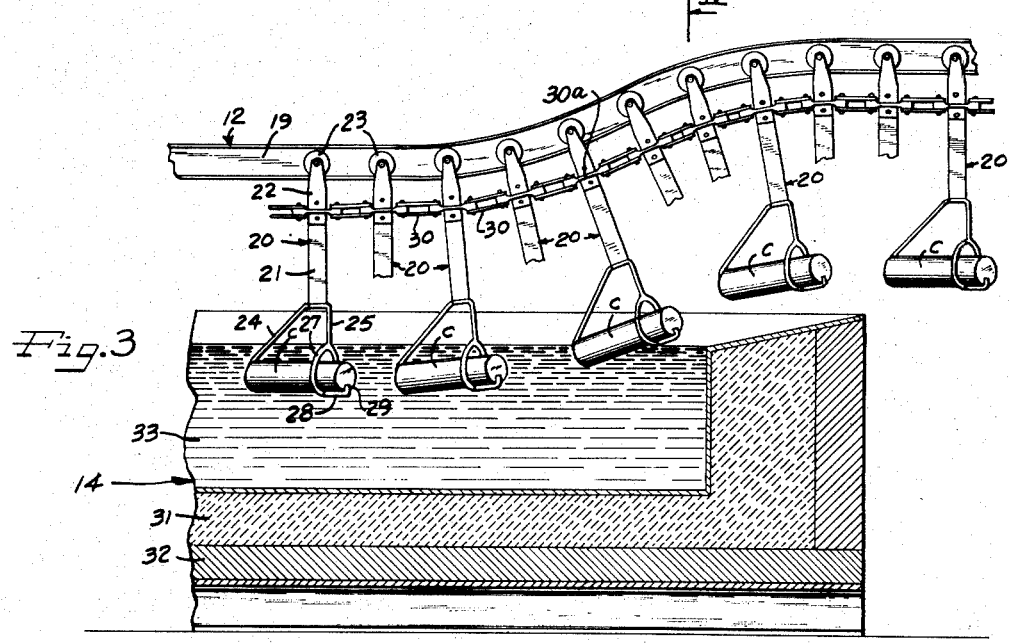
Inventor
George Albert Lyon
by [signature] Attys

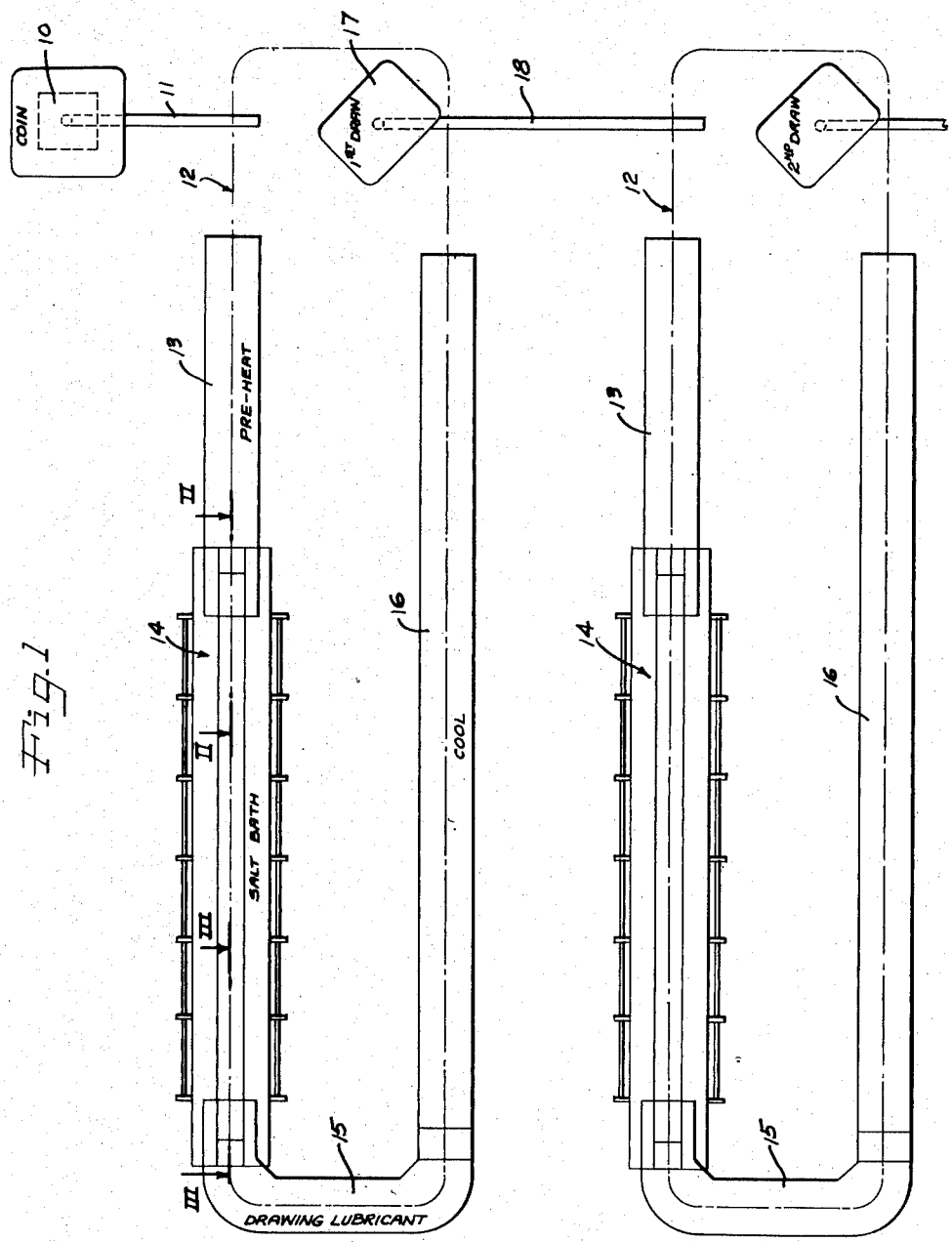

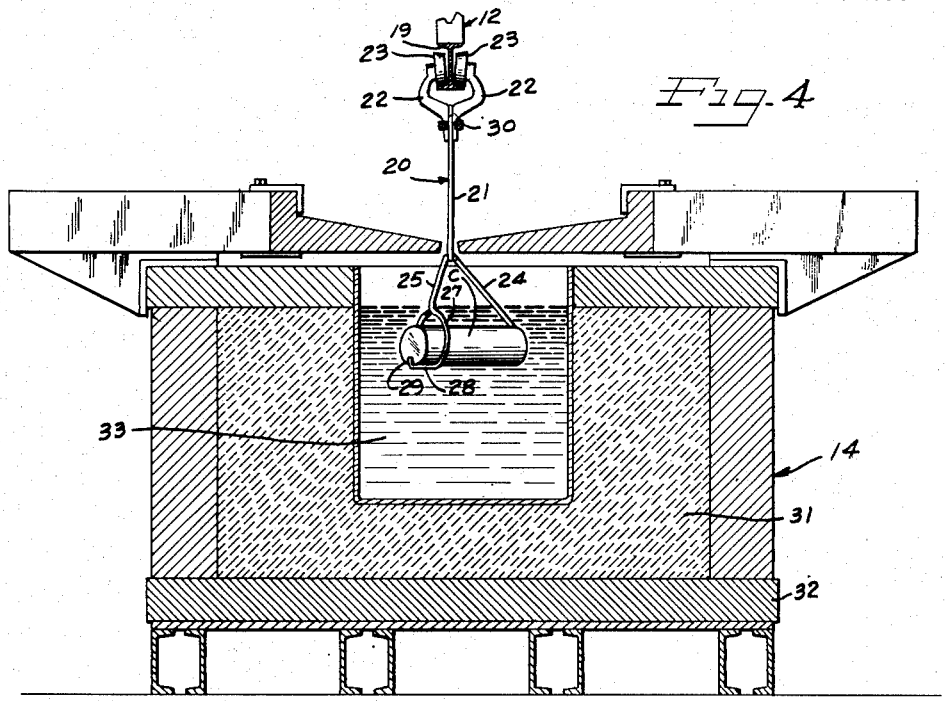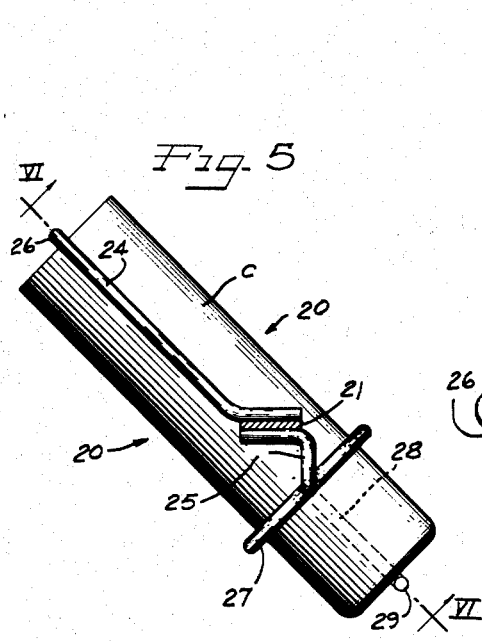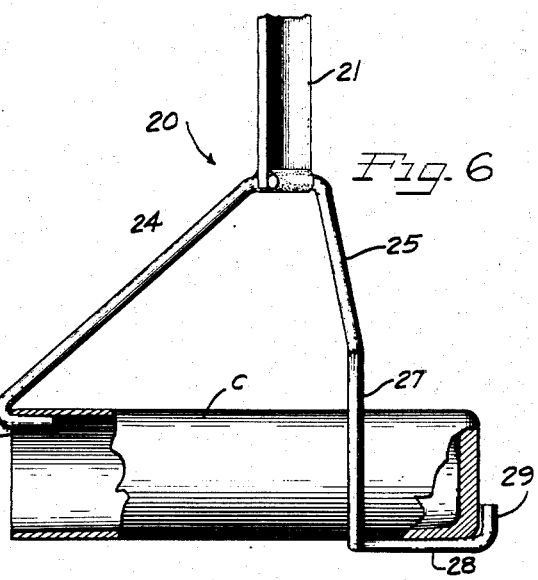

Patented Sept. 21, 1954

2,689,578

UNITED STATES PATENT OFFICE 2,689,578

SYSTEM FOR CONVEYING STAMPINGS INTO AND OUT OF LIQUID BATHS

George Albert Lyon, Detroit, Mich.

Application December 29, 1950, Serial No. 203,419

3 Claims. (Cl. 134—125)

This invention relates to a system for conditioning cup shaped articles between work performing operations thereon and more particularly to a conveyor system for moving the metal cup shaped articles through a liquid bath.

As is well known in the art, it is the practice, in the manufacture of metal cup shaped articles, such as cartridge casings, to condition metallurgically the metal of the articles after each work performing operation in the fabrication of the articles. Such a system is shown generally in my previously issued Patent No. 2,360,354.

It is also old in the art, as evidenced by my own issued Patent No. 2,059,468, to heat treat metal articles in a heated fused salt bath for conditioning the metal after the working of the same.

Heretofore in the manufacture of cup shaped articles, such as cartridge casings, it has been common practice to anneal the article after each drawing opertion in a heated non-oxidizing atmosphere such as is provided in an electrically or gas heated furnace. Such procedure, however, requires that the article remain for a long period of time in the annealing furnace and therefore is not conducive to the rapid handling of articles between draws in a continuous process of fabrication.

It is an object of this invention to provide a conveying and heat treating system, for cup shaped articles during the progressive formation of the same, which can be used to connect up successive work performing stations to the end of providing a continuous system of keeping the articles in motion from one station to the other until the articles have been completely drawn.

I find that I am enabled to accomplish my objective by the use of a novel conveying system which will carry the article, in the process of manufacture, between one working performing station to another and which will during the course of such travel, move the article through a heat treated fused salt bath and such other stages as are necessary for conditioning the article for the following work performing step.

Yet another object of this invention is to provide a system for conveying and heat treating cup shaped articles in the process of manufacture which will materially reduce the cost of manufacturing such articles as well as the time necessary for the fabrication of the same.

In accordance with the general features of this invention, there is provided in a conveyor system for moving cup shaped articles through a heat treating liquid bath, a plurality of spaced article supports, conveyor means entirely above and extending longitudinally of the bath from which the supports are suspended for descent into, movement through, and ascent out of the bath; each of the supports being formed to support the article generally transversely of the path of its movement through the bath and with the closed end of the cup shaped article advancing ahead of its open end so that on ascent of the article out of the bath, the article will be self-draining.

A still further feature of the invention relates to forming a conveyor means in the form of a loop, one leg of which extends away from a work performing station to carry the articles through the heat treating bath and the other leg of which moves the article in an opposite direction through lubricant applying and cooling stages back to a second work performing station. This looped arrangement can be repeated as many times as is necessary, depending on the number of work performing or press stations.

Other objects and features of this invention will more fully appear from the following detailed description taken in connection with the accompanying drawings which illustrate a single embodiment thereof and in which:

Figure 1 is a diagrammatic plan layout of two conveying systems embodying my invention and showing diagrammatically how the articles can be carried from one station through a heat treating bath to an adjoining station;

Figure 2 is a fragmentary cross-sectional view taken on substantially line II—II of Figure 1 looking in the direction indicated by the arrows and with certain of the work supports broken away so as to more clearly illustrate the remaining supports;

Figure 3 is a fragmentary cross-sectional view similar to Figure 2 but taken at the discharge end of the salt bath on a line III—III of Figure 1 looking in the direction indicated by the arrows;

Figure 4 is a cross-sectional view taken on substantially the line IV—IV of Figure 2 through the salt bath furnace and showing the relation of my novel conveying means thereto;

Figure 5 is a plan view, partly in section, taken on the line V—V of Figure 2 looking downwardly and showing how the support diagonally carries the cup shaped article; and Figure 6 is a fragmentary sectional view taken on substantially the line VI—VI of Figure 5 looking in the direction indicated by the arrows and illustrating how the closed end of the article is at the forward end of the support.

As shown on the drawings:

The reference character 10, in Figure 1, designates generally a first work performing station which in this instance involves a coining operation. Any suitable equipment for coining the article, such as that shown in my copending application Serial No. 165,119, filed March 18, 1946, now patent No. 2,603,987, issued July 22, 1952, may be located in this station. Leading from this station is a conveyor 11 on which the articles are placed after the coining operation for delivering them successively to a loop-like conveyor system 12 embodying the features of this invention. This conveyor system carries the articles successively through a suitable preheated chamber 13 and from the chamber into, through and out of a heated fused salt bath 14.

After leaving the bath the system 12 carries the articles through successive stages of treatment of which I have shown two, namely a drawing lubricant applying stage 15 and a cooling stage 16. These latter stages are located on the return travel of the articles back toward a second work performing station 17.

It is, of course, well known in the metal working art that after each working of the metal it is desirable to lubricate the article previous to its next working. Many different forms of lubricants have been used for this purpose, such, for illustration, as powdered chalk, soapstone, mica, graphite, zinc oxide, etc. This lubricant may be applied by any suitable means, although I contemplate that it may be feasible to apply the lubricant to the article while it is in the heat treating bath by introducing a suitable lubricant directly in the bath. Inasmuch as it is usually the practice to apply the lubricant after the heat treating of the article, I have diagrammatically illustrated the lubricant applying station as a separate one 15 immediately following the bath.

It is also common practice in metal working and heat treating of the metal between draws to wash and cool the article after exposure to the heat treating operation. Water sprays are commonly used for the purpose of washing and cooling the heat treated articles.

Where the article is made of brass instead of steel, it has been common practice to use a liquid lubricant compound on the article to be further drawn or worked.

In Figure 1 I have, for purposes of illustration, shown only two conveyor systems 12, connected by a conveyor 18, although it is to be understood that the number of these systems will depend on the number of work performing stations. For illustration, in the manufacture of larger cartridge casings, such as the 105 mm. and 350 mm. casings, it may be necessary to use four or five separate and progressive work performing or drawing operations.

I shall now proceed to describe more in detail my novel conveying system and its interrelationship to the liquid heat treating bath 14 and as better illustrated in Figures 2-6, inclusive.

The conveyor 12 of my invention includes an I-beam track 19 of an I cross-section from which is suspended a plurality of spaced article supports or hangers 20. The hangers are all identical in construction so that a description of one will suffice for all. Each of these article supports includes a vertical bar 21 having secured to its upper end a yoke 22, the spaced arms of which (Figure 4) carry spaced aligned rolls 23—23 adapted to roll along and on the lower flange of the track 19.

The lower end of the bar 21 (Figures 5 and 6) has suitably secured to it a pair of divergent rod-like arms 24—25 for detachably receiving and carrying the cup shaped article of cartridge casing C. The arm 24 has a turned extremity 26 engaging over and inside of the outer edge of the casing at its open end. The other arm 25 has its lower end formed into an eye 27 through which the cartridge casing extends; the casing resting on the lower portion of the eye. The bottom of the eye 27 has a longitudinal arm 28 with a turned extremity 29 adapted to engage and abut the outer surface of the bottom of the casing C.

It will be noted from Figures 4 and 5 that the arms 24 and 25 are connected to the bar 21 at such an angle as to carry the casing in a diagonal position with reference to the direction of movement or direction of the track or rail 19. This arrangement enables the articles to be positioned in close parallel relation and also facilitates the filling and emptying of the casings.

The support or hanger bars 21 are rigid throughout their entire extent and are all connected adjacent their upper ends in spaced vertically articulated relation for movement together along the track 19 by a series of non-buckling links 30 which are of a construction cooperable with any conventional drive means such as sprockets or the like (not shown). To this end, the hanger bars 21 have rigid with the upper end portions thereof forwardly and rearwardly directed cross-arm structure 30a to which the links 30 are respectively pivotally connected about vertical axes. Thereby the bars 20 are enabled to move about the transverse turns in the conveyor 12 but are held against free pivoting about a transverse or horizontal axis.

Also it will be perceived from Figures 2 and 3 that the track or rail 19 is so curved that it descends downwardly toward the inlet of the fused salt bath 14 (Figure 2) and ascends at the outlet end (Figure 3) of the fused salt bath. In other words, the track has an intermediate downward bend over the top of the fused salt bath 14. By virtue of the non-buckling character of the links 30 and the manner in which the rigid bars 21 are controlled by the links, the major lower end portions of the bars below the links will swing rearwardly as the bars move down the curved descending portion of the track 19, whereby to tilt upwardly the open ends of the casings C supported thereby, while at the ascending portion of the track the bars 20 swing forwardly and thereby move the casings C toward upended position.

This arrangement is such that the articles enter the bath bottom first and must likewise ascend out of the bath bottom first. This feature, together with the diagonal positioning of each of the articles, enables a proper filling and emptying of the articles with heated liquid as they traverse the length of the bath. It is very desirable that each article be completely emptied of any of the bath liquid so as to minimize the likelihood of the adherence of any of the salts thereto.

The fused salt bath 14 may be of any suitable construction and includes a central container 35 for the liquid, a refractory lining 31 and outer brick or ceramic material 32. The bath 33 may be made up of any suitable fused salts such, for example, as that disclosed in my aforesaid previously issued Patent No. 2,059,468.

Any suitable means may be employed for heating up the fused salts to maintain the same in heated liquid form suitable for the heat conditioning desired. The extent to which the bath is heated depends upon the character of the steel being treated, although, for illustration, excellent results may be attained by maintaining the bath at a temperature of about 1250° F.

The time during which the casings are in the bath depends upon the size of the casing and the character of the steel, although it should only require a few minutes to effect the conditioning as distinguished from hours now used in a heated atmosphere type furnace.

I find that by using my novel process of conveying and heat treating the steel casings I am enabled to obtain a finer grain structure in the steel of the casing than is possible with the use of heated atmosphere type furnaces.

In addition, where the salt bath is being used to anneal previously worked steel, I find that I do not have to reduce the hardness of the steel to the same extent as in previous practices. For illustration, with a steel having a hardness of 95 Rockwell, it has been the practice heretofore to anneal the worked steel to reduce its Rockwell reading to around 60 Rockwell. With my process I find I need only reduce the Rockwell to about 73–75. This provides me with a better drawing steel and enables me to produce a casing with greater tensile strength.

While I have described above my hanger type conveyor in conjunction with a fused salt bath for annealing, it will be appreciated that the same conveyor can be used with equal advantage in carrying the articles through other baths, such as a pickling bath, a hardening brine bath, or a lubricating bath. Notwithstanding this fact, my invention is especially adapted for use with an annealing fused salt bath because it makes possible the shortening of the time required for the annealing of the articles and whereby the annealing and other conditioning treatments can be included in a continuous production line-up including the coining and drawing presses themselves.

By continuously carrying the casings through all of the fabricated operations from blank to ultimate product, it is not necessary to have intermediate pile ups of material or dwells in operation such as occur where the articles have to be taken out of the line-up for a three or four hour annealing operation. Therefore, my process materially cuts down on the cost of fabricating the product and at the same time enables the production of a product having better grain structure and greater tensile strength.

It will be understood that modifications and variations may be effected without departing from the scope of the novel concepts of the present invention.

I claim as my invention:

1. In a conveyor system for moving cup-shaped articles through a liquid bath and including a track curved downwardly toward an inlet end of the bath and upwardly away from the outlet end of the bath, the improvements comprising a plurality of article supporting elongated rigid bars suspended at spaced intervals from and supported to move along said track, means on the lower end portions of said bars for removably holding respective cup-shaped articles with the closed ends of the articles advancing ahead of the open ends of the articles as the bars move along said track, non-buckling link means connected to the upper portions of each pair of adjacent bars to positively hold the bars in spaced vertically articulated relation and to prevent free pivoting of the bars about a transverse or horizontal axis, said bars being held by said link means to swing the major lower portions thereof rearwardly during travel of the bars on the downwardly curved portion of the track and for swinging forwardly during travel on the upwardly curved portion of the track so that on the descending portion of the track the cup-shaped articles will be directed into the bath closed end first and open end last to assure complete filling of the articles with liquid upon immersion and so that on the ascending portion of the track the articles will be supported with the open end down for efficient emptying of liquid from the articles.

2. In a conveyor system for moving cup-shaped articles through a liquid bath and including a track having a portion curving upwardly from an outlet end of the bath, the improvements comprising means riding on said track in spaced series relation and carrying depending therefrom elongated respective bars of substantial length rigid throughout their entire extent and depending below the track a substantial distance, respective article carrying means fixed to the lower extremities of said bars for removably receiving and carrying cup-shaped articles in generally horizontal position with the closed ends thereof directed forwardly and the open ends directed generally rearwardly, non-buckling link means connected to the upper portions of each pair of adjacent bars to positively hold the bars in spaced vertically articulated relation but to prevent free pivoting of the bars about a transverse or horizontal axis, the major portions of the bars extending below said link means, and said bars being held by said link means to swing up and extend substantially normal to said upwardly curving track in a tilted position on leaving said bath so as to generally upend the articles on leaving the bath to assure emptying of liquid therefrom.

3. In a conveyor system for moving cup-shaped articles through a liquid bath and including a track having a portion curving downwardly toward the inlet end of said bath, the improvements comprising means riding on said track in spaced series relation, an elongated bar of substantial length rigid throughout its entire extent extending below each of said means, respective structures fixed to the lower extremities of said bars for detachably receiving and carrying cup-shaped articles in generally horizontal position with the closed ends directed forwardly and the open ends directed rearwardly, non-buckling link means connected to the upper portions of each pair of adjacent bars to positively hold said bars in spaced relation and preventing free pivoting of the bars about a transverse or horizontal axis, and said bars being held by said link means to swing up rearwardly into a tilted position relative to said bath as said means riding on the track moves along said downwardly curving portion of the track, so that the articles on entering the bath move thereinto closed end first with the open ends directed generally upwardly to assure filling of the articles with bath liquid as the articles are immersed in the bath.

References Cited in the file of this patent

UNITED STATES PATENTS

| Number | Name | Date |
| --- | --- | --- |
| 654,369 | Wagner | July 24, 1900 |
| 861,307 | McKinney | July 30, 1907 |
| 1,132,999 | Beers | Mar. 23, 1915 |
| 1,226,856 | Bradley | May 22, 1917 |
| 1,237,860 | Beansejour | Aug. 21, 1917 |
| 1,338,782 | Lindahl | May 4, 1920 |
| 1,494,436 | Lormor | May 20, 1924 |
| 1,672,799 | Benner | June 5, 1928 |
| 1,759,502 | George | May 20, 1930 |
| 1,810,416 | Francis | June 16, 1931 |
| 1,953,647 | Darrah | Apr. 3, 1934 |
| 2,058,804 | Knies | Oct. 27, 1936 |
| 2,182,364 | Smith | Dec. 5, 1939 |
| 2,303,122 | Heineman | Nov. 24, 1942 |
| 2,482,269 | Grimes | Sept. 20, 1949 |
| 2,512,643 | Hannon | June 27, 1950 |